(12) United States Patent
Ferkel et al.

(10) Patent No.: US 12,320,459 B2
(45) Date of Patent: Jun. 3, 2025

(54) CONDUIT COUPLING WITH INDICATOR OF BEND PLANE

(71) Applicant: Caterpillar Inc., Peoria, IL (US)

(72) Inventors: Bailey Justin Ferkel, Menominee, MI (US); Gary M Steen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 420 days.

(21) Appl. No.: 17/658,915

(22) Filed: Apr. 12, 2022

(65) Prior Publication Data

US 2023/0323992 A1    Oct. 12, 2023

(51) Int. Cl.
| F16L 43/00 | (2006.01) |
| B21D 7/06 | (2006.01) |
| F16L 27/08 | (2006.01) |

(52) U.S. Cl.
CPC ............. *F16L 43/001* (2013.01); *B21D 7/063* (2013.01); *F16L 27/0837* (2013.01); *F16L 2201/60* (2013.01)

(58) Field of Classification Search
CPC ..... F16L 43/001; F16L 2201/60; F16L 43/00; F16L 27/0837
See application file for complete search history.

(56) References Cited

U.S. PATENT DOCUMENTS

| 4,077,657 | A | * | 3/1978 | Trzeciak | ................ | E21B 7/067 |
| | | | | | | 175/320 |
| 5,125,463 | A | * | 6/1992 | Livingstone | ............ | E21B 7/067 |
| | | | | | | 175/320 |
| 5,168,943 | A | * | 12/1992 | Falgout, Sr. | ............ | E21B 7/067 |
| | | | | | | 175/256 |
| 10,746,332 | B1 | | 8/2020 | Haines | | |
| 2011/0140411 | A1 | * | 6/2011 | Marchand | ............... | E21B 7/067 |
| | | | | | | 285/184 |
| 2015/0292661 | A1 | | 10/2015 | Gilbreath et al. | | |
| 2016/0153599 | A1 | | 6/2016 | Yokoyama | | |
| 2020/0250358 | A1 | * | 8/2020 | McGrath | ................ | G06Q 50/04 |

FOREIGN PATENT DOCUMENTS

| CN | 103032429 A | 4/2013 | | |
| EP | 0831266 | 3/1998 | | |
| EP | 3718696 A1 | 10/2020 | | |
| GB | 1116612 A | * 6/1968 | ........... | B29D 23/006 |
| JP | 2017194139 A | 10/2017 | | |
| KR | 20020065428 | 8/2002 | | |

* cited by examiner

*Primary Examiner* — James M Hewitt, II

(57) ABSTRACT

A conduit coupling includes a first connector at a first end of the conduit coupling, a second connector at a second end of the conduit coupling, and a stem between the first connector and the second connector. A first end of the stem is attached to the first connector. A second end of the stem is attached to the second connector. The stem is bent at a particular bend angle along a bend plane. The first connector includes an indicator that indicates an orientation of the bend plane.

15 Claims, 7 Drawing Sheets

CONDUIT COUPLING WITH INDICATOR OF BEND PLANE

TECHNICAL FIELD

The present disclosure relates generally to a conduit coupling and, for example, to a conduit coupling with an indicator of a bend plane.

BACKGROUND

A conduit assembly (e.g., a hydraulic hose assembly, a fuel line assembly, or another type of conduit assembly) includes a first conduit coupling attached to a first end of a conduit and a second conduit coupling attached to a second end of the conduit. The conduit couplings are configured to attach to other components, such as components associated with a hydraulic system or an engine. In many cases, each of the conduit couplings may have a stem that is bent at a particular bend angle along a bend plane. Further, to enable connection of the conduit assembly to the other components (e.g., that are arranged in a specific geometric configuration), the respective bend planes of the conduit couplings need to be oriented to each other at a particular orientation angle.

To assemble the conduit assembly, a human worker often uses specialized tools (e.g., digital protractors or other tools that require particular know-how to utilize correctly) and/or specially made jigs to hold the conduit couplings in place so that the particular orientation angle is achieved when the conduit couplings are attached to the conduit. This can be a time-consuming and labor-intensive task that is prone to error (e.g., the conduit couplings can be attached such that the respective bend planes are not oriented at the particular orientation angle), which can affect a performance of the conduit assembly and/or an operable life of the conduit assembly.

The conduit coupling with an indicator of a bend plane of the present disclosure solves one or more of the problems set forth above and/or other problems in the art.

SUMMARY

In some implementations, a conduit coupling includes: a first connector at a first end of the conduit coupling; a second connector at a second end of the conduit coupling; and a stem between the first connector and the second connector, wherein: a first end of the stem is attached to the first connector, a second end of the stem is attached to the second connector, the stem is bent at a particular bend angle along a bend plane, and the first connector includes an indicator that indicates an orientation of the bend plane.

In some implementations, a conduit assembly includes: a conduit; a first conduit coupling attached to a first end of the conduit; and a second conduit coupling attached to a second end of the conduit, wherein: the first conduit coupling includes a first stem bent at a first bend angle along a first bend plane, the first conduit coupling includes a first indicator that indicates an orientation of the first bend plane, the second conduit coupling includes a second stem bent at a second bend angle along a second bend plane, and the second conduit coupling includes a second indicator that indicates an orientation of the second bend plane.

In some implementations, a system for bending a stem of a conduit coupling includes: a die for holding a first connector of the conduit coupling that is attached to a first end of the stem of the conduit coupling; and one or more components for holding a second connector of the conduit coupling that is attached to a second end of the stem of the conduit coupling, wherein: the die includes a marking feature, and the marking feature is to create an indicator on a surface of the first connector when the system is to bend the stem of the conduit coupling to a particular bend angle along a bend plane, wherein the indicator is to indicate an orientation of the bend plane.

DETAILED DESCRIPTION

This disclosure relates to a conduit coupling with an indicator of a bend plane (e.g., of a stem of the conduit coupling that is bent at a particular angle), which is applicable to any machine that utilizes a conduit assembly that includes conduit couplings with bent stems. For example, the machine may be a construction machine, a marine vessel, an automobile, a transportation vehicle, or another type of machine.

Figure 1A:
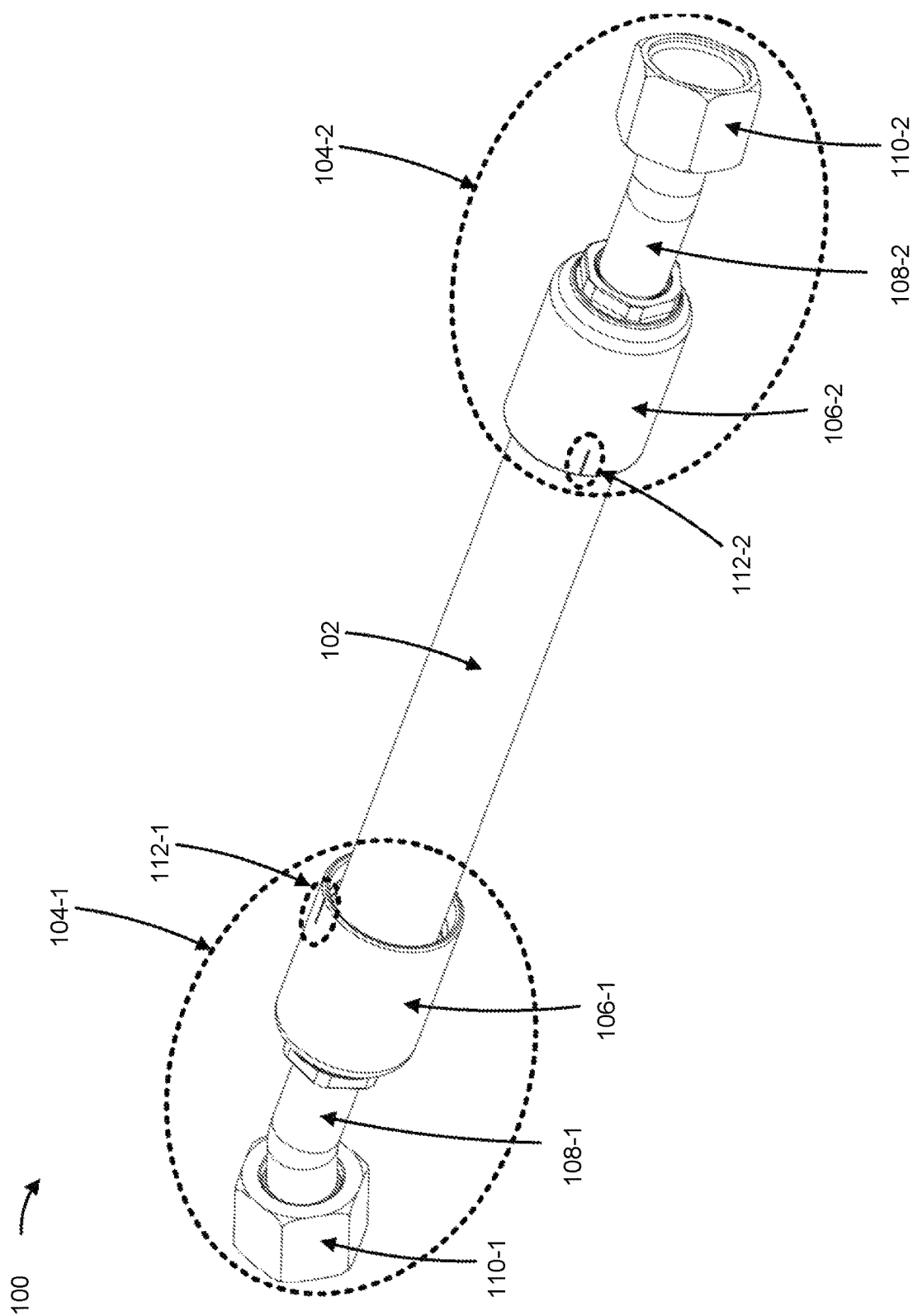
FIGS. 1A-1C are diagrams relating to an example conduit assembly described herein.
Figure 1B:
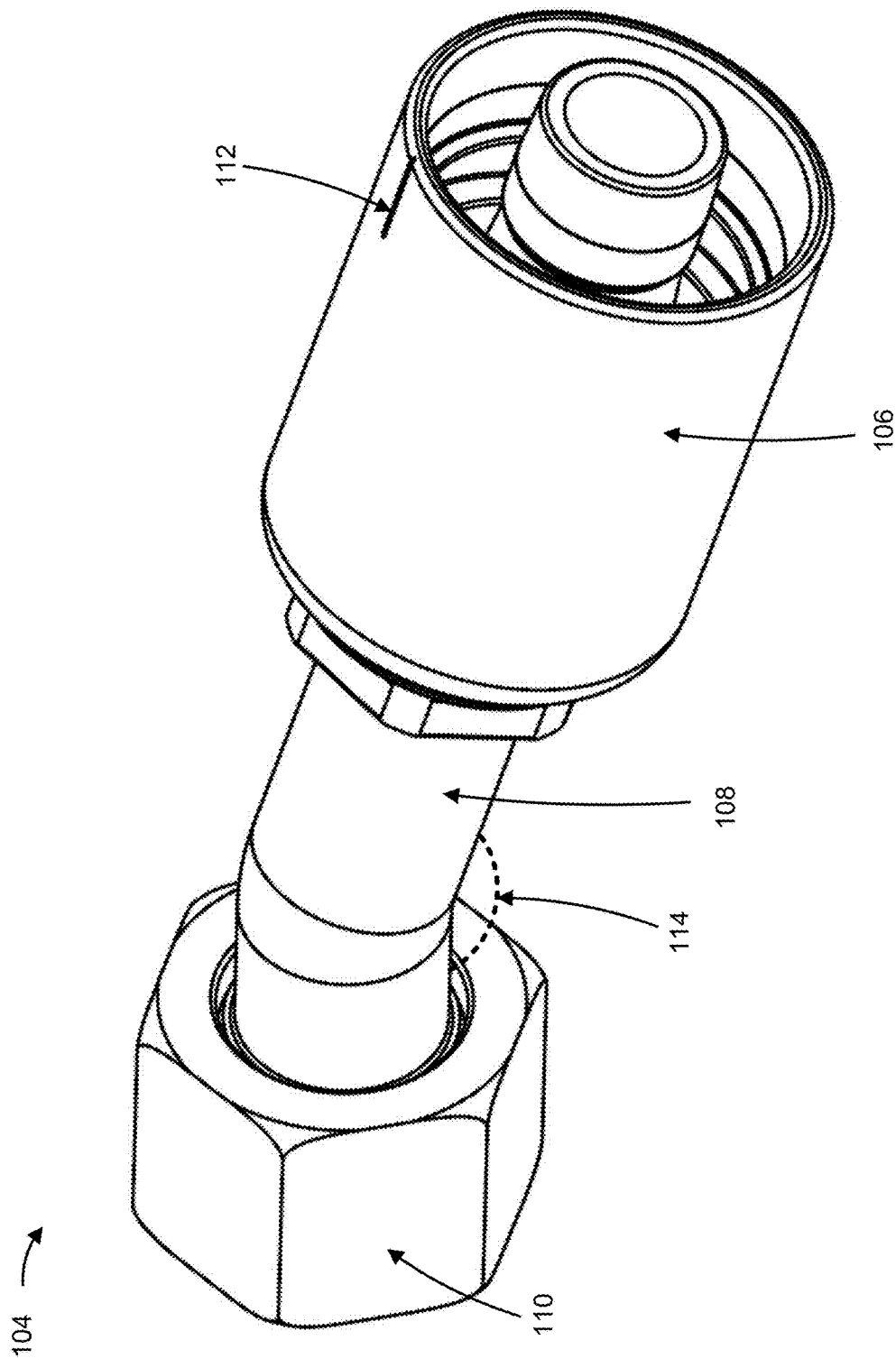
Figure 1C:
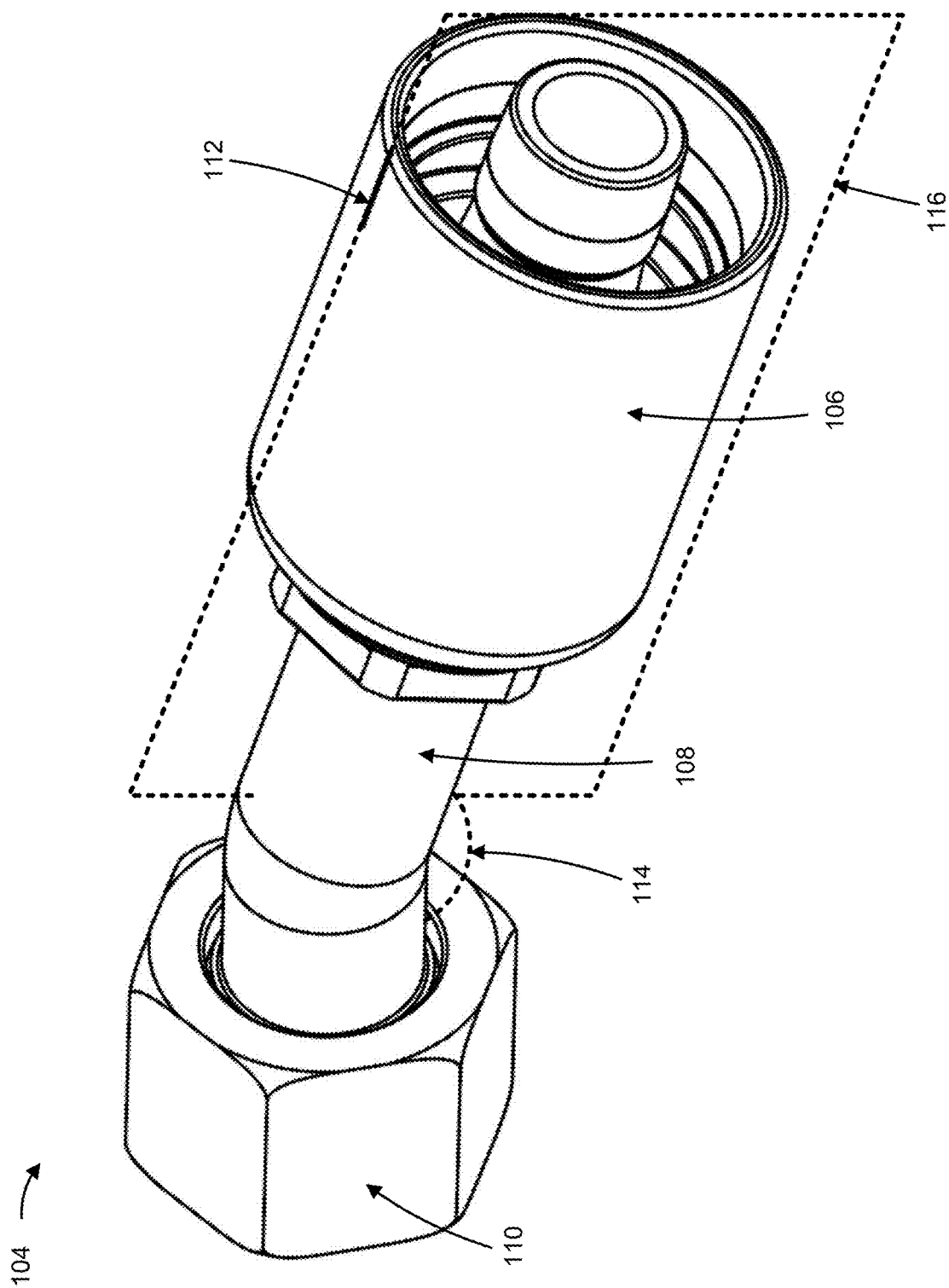

FIGS. 1A-1C are diagrams relating to an example conduit assembly 100, such as a hydraulic hose assembly, a fuel line assembly, an electrical duct assembly, or another type of conduit assembly. The conduit assembly 100 may include a conduit 102 (e.g., a hose, a tube, or a duct, among other examples) and one or more conduit couplings 104. For example, as shown in FIG. 1A, the conduit coupling 104 may include a first conduit coupling 104-1 attached to a first end (shown as a left end) of the conduit 102 and a second conduit coupling 104-2 attached to a second end (shown as a right end) of the conduit 102.

A conduit coupling 104, of the one or more conduit couplings 104, may include a first connector 106, a stem 108, a second connector 110, and an indicator 112. For example, as shown in FIG. 1A, the first conduit coupling 104-1 may include a first connector 106-1, a stem 108-1, a second connector 110-1, and an indicator 112-1, and the second conduit coupling 104-2 may include a first connector 106-2, a stem 108-2, a second connector 110-2, and an indicator 112-2.

As shown in FIGS. 1B-1C, the first connector 106 of the conduit coupling 104 may be disposed at a first end (shown as a right end) of the conduit coupling 104, the second connector 110 may be disposed at a second end (shown as a left end) of the conduit coupling 104), and the stem 108 may be disposed between the first connector 106 and the second connector 110. A first end (shown as a right end) of the stem 108 may be attached to the first connector 106 and a second end (shown as a left end) of the stem 108 may be attached to the second connector 110.

The first connector 106 may be configured to connect to the conduit 102. For example, the first connector 106 may be a ferrule, or another connector, that is to attach to the conduit 102. In some implementations, as shown in FIGS. 1B-1C, the first connector 106 may have a surface (e.g., an external surface) that has a cylindrical profile (e.g., with a round cross-section). Accordingly, as shown in FIG. 1A, the first connectors 106-1 and 106-2 may have surfaces with cylindrical profiles and may be connected to the conduit 102.

The second connector 110 may be configured to connect to another component (e.g., other than the conduit 102, such as a component associated with a hydraulic system, an engine, an electrical system, or another system). For example, the second connector 110 may be a threaded adapter, a flange port, or another connector, that is to connect to the other component. Accordingly, as shown in FIG. 1A, the second connectors 110-1 and 110-2 may not be connected to the conduit 102.

As further shown in FIGS. 1B-1C, the stem 108 may be bent at a particular bend angle 114 along a bend plane 116 (e.g., the particular bend angle 114 may be in line with, or parallel to, the bend plane 116). The particular bend angle 114 may be less than or equal to a bend angle threshold (and thus the particular bend angle 114 may be termed a "small" bend angle). The bend angle threshold may be less than or equal to, for example, 5 degrees, 10 degrees, 15 degrees, 25 degrees, 45 degrees, 60 degrees, 80 degrees, and/or 90 degrees.

Accordingly, as shown in FIG. 1A, the stem 108-1 of the conduit coupling 104-1 may be bent at a first bend angle along a first bend plane (not shown in FIG. 1A) and the stem 108-2 of the conduit coupling 104-2 may be bent at a second bend angle along a second bend plane (not shown in FIG. 1A). The first bend angle and the second bend angle may be the same or different (e.g., may be equal to, or not equal to, each other), and at least one of the first bend angle or the second bend angle may be less than or equal to the bend angle threshold (e.g., at least one of the first bend angle or the second bend angle may be termed a small bend angle). The first bend plane and the second bend plane may be the same or different (e.g., may be parallel to, or not parallel to, each other).

As shown in FIGS. 1B-1C, the first connector 106 of the conduit coupling 104 may include the indicator 112. For example, the indicator 112 may be disposed on the surface (e.g., the external surface with the cylindrical profile) of the first connector 106. Accordingly, as shown in FIG. 1A, the first connector 106-1 of conduit coupling 104-1 may include the indicator 112-1 on a surface of the first connector 106-1, and the second connector 106-2 of conduit coupling 104-2 may include the indicator 112-2 on a surface of the second connector 106-2.

The indicator 112 may be an indentation (e.g., an impression, a cut, a notch, a depression, a recess, or another type of indentation), an imprint (e.g., a printed feature comprising paint or ink, or another type of imprint), or another type of mark (e.g., on the surface of the first connector 106). The indicator 112 may be shaped as one or more lines, one or more arrows, one or more polygons (e.g., one or more triangles or one or more squares), one or more round shapes (e.g., one or more circles or one or more ovals), and/or one or more other shapes. For example, as shown in FIGS. 1B-1C, the indicator 112 may be an indentation, shaped as a single line, on the surface of the first connector 106.

As further shown in FIG. 1C, the indicator 112 (e.g., shaped as the indented line) may be aligned with (e.g., in line with and/or parallel to) the bend plane 116. In this way, the indicator 112 may indicate (e.g., visually indicate, when viewed by an observer of the indicator 112) an orientation of the bend plane 116 (e.g., along which the stem 108 is bent at the particular bend angle 114). Accordingly, as shown in FIG. 1A, the indicator 112-1 may be disposed on the surface of the first connector 106-1 and aligned with the first bend plane, and therefore may indicate an orientation of the first bend plane; and the indicator 112-2 may be disposed on the surface of the first connector 106-2 and aligned with the second bend plane, and therefore may indicate an orientation of the second bend plane.

The indicator 112 may have a particular width (e.g., wherein the width is orthogonal to the bend plane 116). For example, the indicator 112 may have a width that is less than or equal to a portion of a circumference of the surface (e.g., the external surface with the cylindrical profile) of the first connector 106 that is associated with a particular degree value. The particular degree value may be less than or equal to, for example, 0.5 degrees, 1 degree, 1.5 degrees, 2 degrees, 2.5 degrees, and/or 3 degrees. In this way, the width of the indicator 112 may indicate an amount of precision associated with indicating the orientation of the bend plane 116. In some implementations, the indicator 112 may include additional information, such as a string of numbers, characters, and/or other elements, that indicates the amount of precision (e.g., to indicate 1 degree of precision, the indicator may include a string stating "1 degree," or a number 1 with a degree (°) symbol.

Accordingly, as shown in FIG. 1A, a width of the indicator 112-1 may be less than or equal to a portion of a circumference of the surface of the first connector 106-1 that is associated with the particular degree value, and a width of the indicator 112-2 may be less than or equal to a portion of a circumference of the surface of the first connector 106-2 that is associated with the particular degree value. Accordingly, the width of the indicator 112-1 may indicate an amount of precision associated with indicating the orientation of the first bend plane, and the width of the indicator 112-2 may indicate an amount of precision associated with indicating the orientation of the second bend plane.

In some implementations (e.g., as further described herein in relation to FIG. 3), the first conduit coupling 104-1 may be attached to the first end of the conduit 102 and the second conduit coupling 104-2 may be attached to the second end of the conduit 102 such that the first bend plane and the second bend plane are oriented to each other at a particular orientation angle (e.g., that is identified in an assembly specification for the conduit assembly 100).

As indicated above, FIGS. 1A-1C are provided as an example. Other examples may differ from what is described in connection with FIGS. 1A-1C.

Figure 2A:
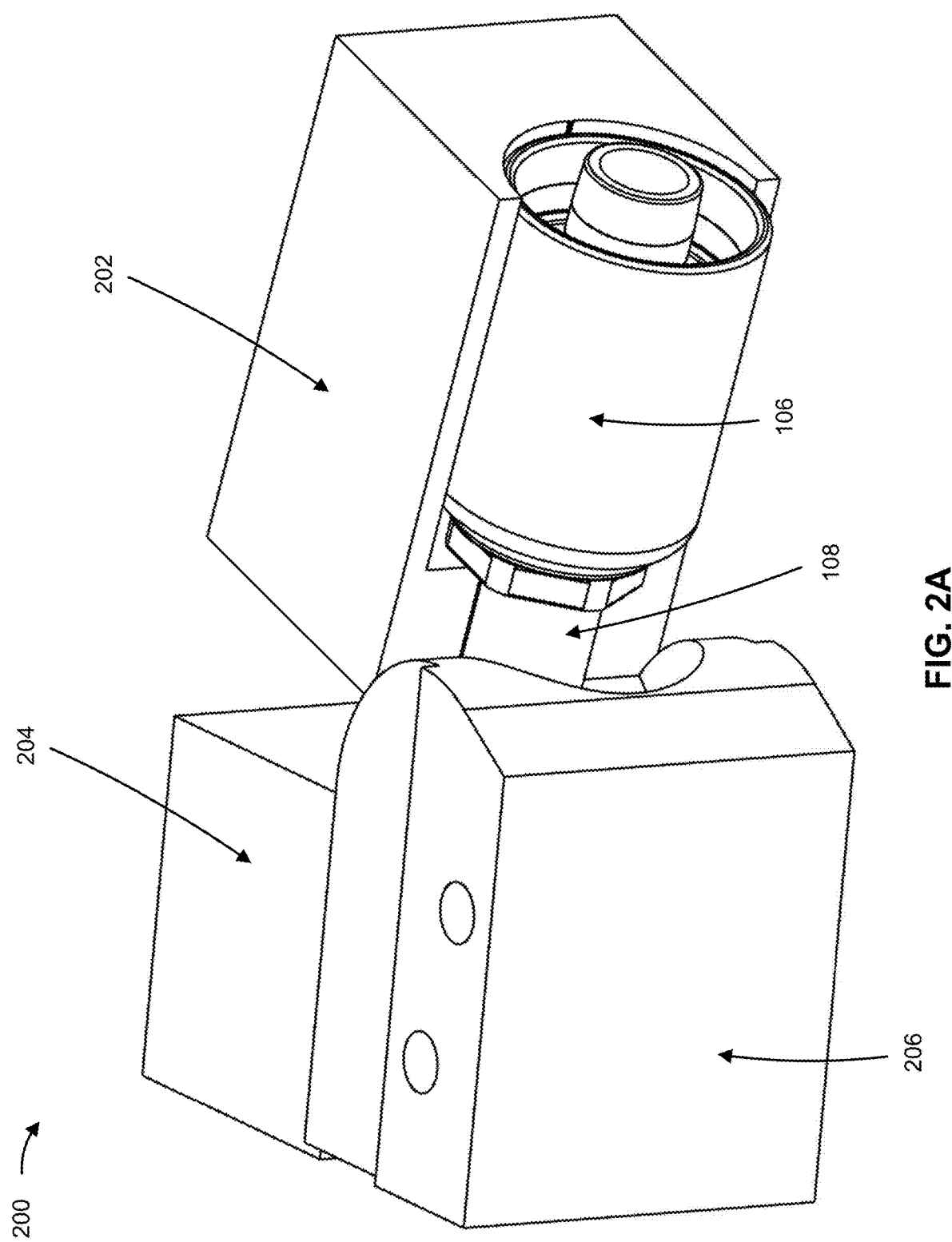
FIGS. 2A-2C are diagrams relating to an example system for bending a stem of a conduit coupling described herein.
Figure 2B:
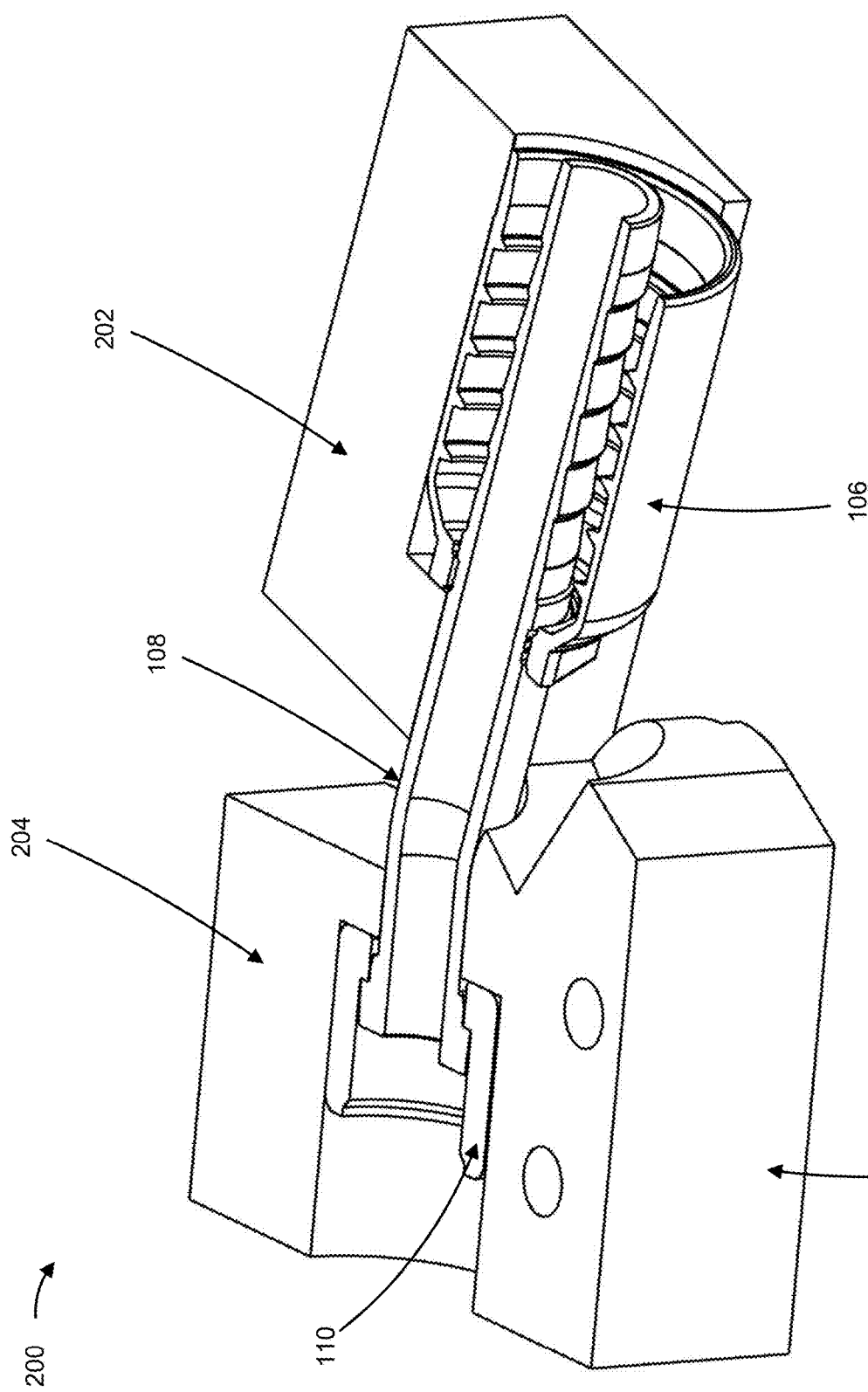
Figure 2C:
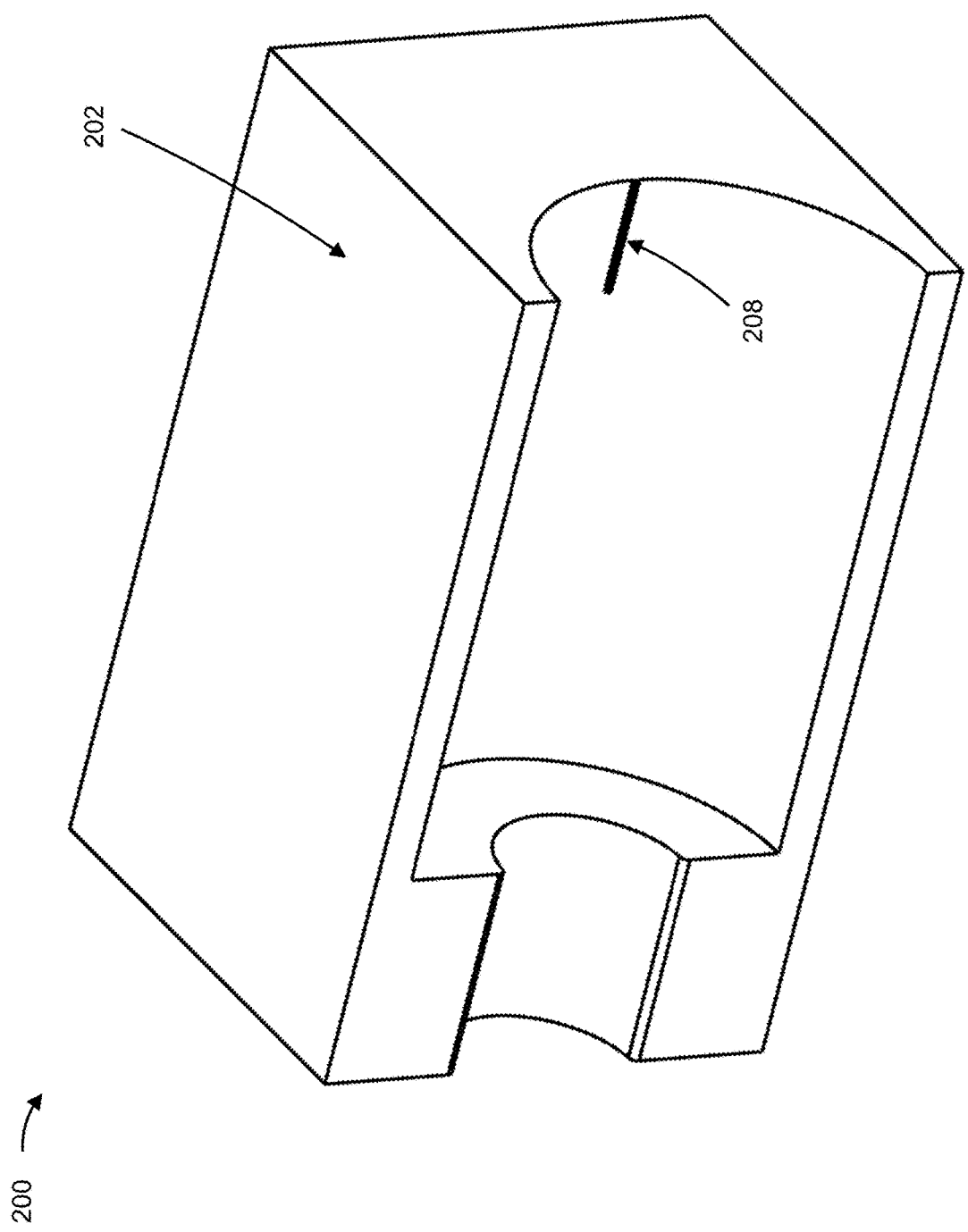

FIGS. 2A-2C are diagrams relating to an example system 200 for bending the stem 108 of the conduit coupling 104 described herein. As shown in FIGS. 2A-2B, the system 200 may include a die 202 (e.g., a press die) and one or more components (shown as a clamp die 204 and a radius block 206). The die 202 may be configured to hold the first connector 106 of the conduit coupling 104 (e.g., that is attached to the first end of the stem 108 of the conduit coupling 104). The one or more components may be configured to hold the second connector 110 of the conduit coupling 104 (e.g., that is attached to the second end of the stem 108 of the conduit coupling 104). For example, as shown in FIG. 2B, the clamp die 204 may hold a top portion of the second connector 110 and the radius block 206 may hold a bottom portion of the second connector 110.

The system 200, or another system, may be configured to apply a force to the one or more components (e.g., via a hydraulic cylinder, not shown in FIGS. 2A-2C) to cause the system 200 to bend the stem 108 to the particular bend angle 114 along the bend plane 116 (e.g., as shown in FIGS. 1B-1C). The system 200 may be configured to cause the particular bend angle 114 to be less than or equal to the bend angle threshold described herein in relation to FIGS. 1A-1C.

As shown in FIG. 2C, the die 202 may include a marking feature 208. The marking feature 208 may disposed on an internal surface of the die 202, such that the marking feature 208 may be disposed on the surface (e.g., the external surface) of the first connector 106 of the conduit coupling 104 when the die 202 holds the first connector 106. The marking feature 208 may be configured to create the indicator 112 on the surface of the first connector 106, such as when the system 200 is to bend the stem 108 to the particular bend angle 114 along the bend plane 116. That is, the force applied to the one or more components that causes the system 200 to bend the stem 108 may cause the marking feature 208 to interact with the surface of the first connector 106 to create the indicator 112 on the surface of the first connector 106.

As further shown in FIG. 2C, the marking feature 208 may be a raised feature (e.g., a protrusion) that is configured to create, as the indicator 112, an indentation on the surface of the first connector 106 (e.g., when the system 200 is to bend the stem 108 to the particular bend angle 114 along the bend plane 116). Alternatively, the marking feature 208 may be an imprint feature (e.g., a pen, brush, or other element) that is configured to create, as the indicator 112, an imprint on the surface of the first connector 106 (e.g., when the system 200 is to bend the stem 108 to the particular bend angle 114 along the bend plane 116). Accordingly, the marking feature 208 may be aligned with the bend plane 116 when the system 200 is to bend the stem 108 to the particular bend angle 114 (e.g., to cause the indicator 112 to be aligned with the bend plane 116).

As indicated above, FIGS. 2A-2C are provided as an example. Other examples may differ from what is described in connection with FIGS. 2A-2C.

Figure 3:
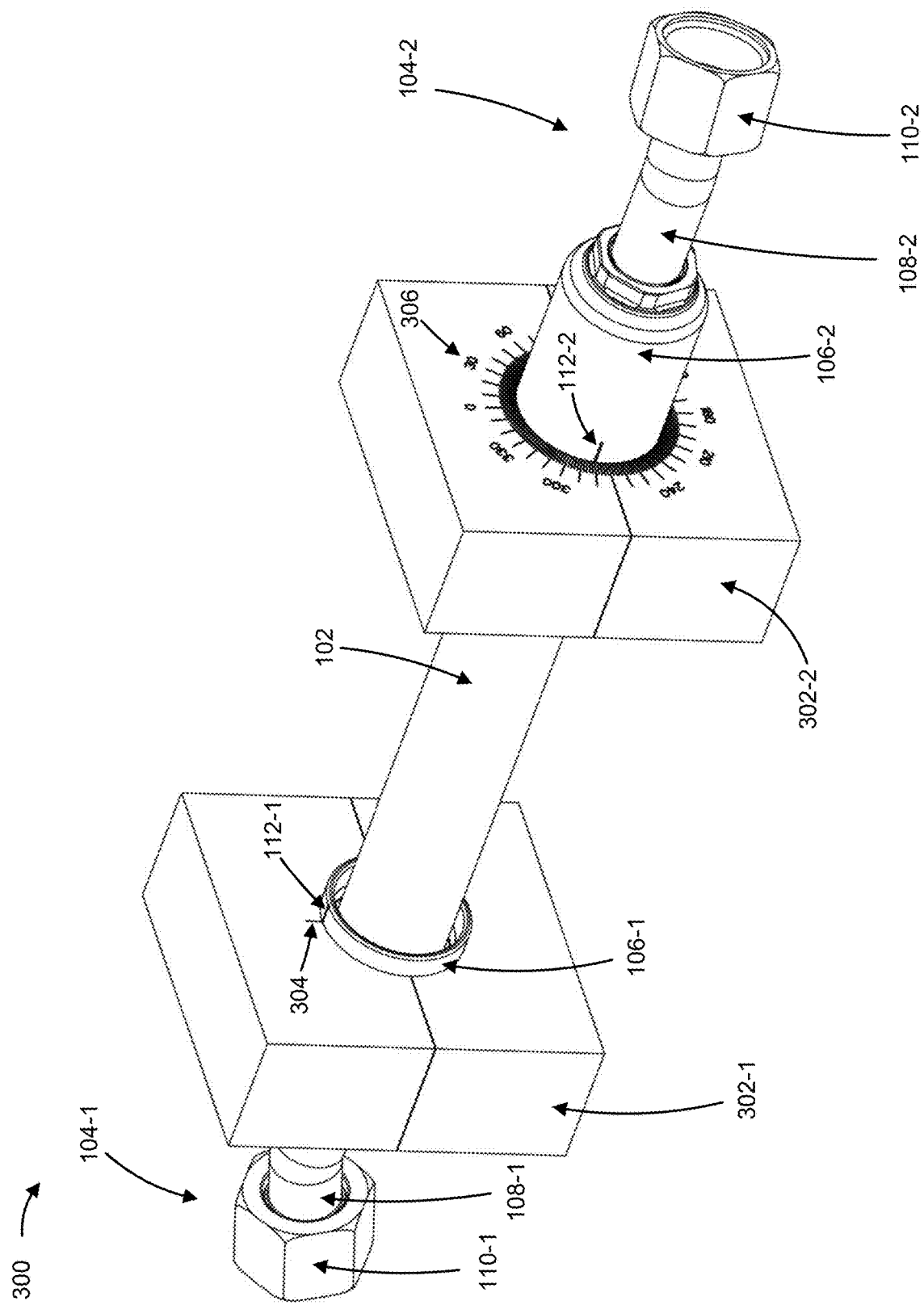
FIG. 3 is a diagram relating to an example system for orienting conduit couplings of the conduit assembly described herein.

FIG. 3 is a diagram relating to an example system 300 for orienting the conduit couplings 104 of the conduit assembly 100 (e.g., when attaching the conduit couplings 104 to the conduit assembly 100). For example, the system 300 may be used to orient the first conduit coupling 104-1 and the second conduit coupling 104-2 of the conduit assembly 100 (e.g., described herein in relation to FIGS. 1A-1C), such that the first bend plane associated with the first conduit coupling 104-1 and the second bend plane associated with the second conduit coupling 104-2 are oriented to each other at a particular orientation angle.

As shown in FIG. 3, the system 300 may include orientation components 302 (shown as a first orientation component 302-1 and a second orientation component 302-2). Each orientation component 302 may include a front surface and a back surface, wherein a hole passes through the orientation component 302 from the front surface to the back surface. The hole may be configured to allow the conduit 102 and/or a first connector 106 of a conduit coupling 104 to pass through the hole. As further shown in FIG. 3, the front surface may include an origination indicator 304 and the back surface may include an orientation dial 306.

The origination indicator 304 may be an indentation, an imprint, or another type of mark (e.g., shown in FIG. 3 as shaped as a line) that is to align with an indicator 112 of a conduit coupling 104, as further described herein. The orientation dial 306 may include multiple marks (e.g., shown in FIG. 3 as shaped as multiple lines) that indicate respective orientation angles (or orientation angle ranges) relative to the origination indicator 304. A particular mark of the orientation dial 306 (e.g., that is associated with a particular orientation angle) is to align with an indicator 112 of a conduit coupling 104, as further described herein.

For example, an operator (e.g., a human worker, a robot operator, and/or a machine) may attach the first conduit coupling 104-1 to the first end of the conduit 102. The operator then may pass the conduit 102 and/or the first connector 106-1 of the first conduit coupling 104-1 through the hole of the first orientation component 302-1 and may cause (e.g., by turning the first conduit coupling 104-1) the indicator 112-1 (e.g., on the external surface of the first connector 106-1) to be aligned with (e.g., to be in line with and/or parallel to) the origination indicator 304. In this way, the first bend angle associated with the first conduit coupling 104-1 may be aligned with the origination indicator 304 (e.g., at a "0 degree" orientation angle).

The operator may pass the second end of the conduit 102 through the hole of the second orientation component 302-2 and may place the second conduit coupling 104-2 on the second end of the conduit. The operator may insert the first connector 106-2 of the second conduit coupling 104-2 in the hole and may cause (e.g., by turning the second conduit coupling 104-2) the indicator 112-2 (e.g., on the external surface of the first connector 106-2) to be aligned with (e.g., to be in line with and/or parallel to) a particular mark of the orientation dial 306 (e.g., that is associated with a particular orientation angle relative to the 0 degree orientation angle, such as an orientation angle identified in an assembly specification for the conduit assembly 100). In this way, the second bend angle associated with the second conduit coupling 104-2 may be aligned with the particular mark of the orientation dial 306 (e.g., at the particular orientation angle).

The operator may remove the orientation components 302 (e.g., by sliding the orientation components 302 off the first conduit coupling 104-1, the second conduit coupling 104-2, and/or the conduit 102, or by splitting apart portions of the orientation components 302, such as along separation joints of the orientation components 302). The operator then may attach the second conduit coupling 104-2 to the second end of the conduit 102 (while maintaining the particular orientation angle of the second conduit coupling 104-2).

In this way, the operator may attach the first conduit coupling 104-1 to the first end of the conduit 102 and the second conduit coupling 104-2 to the second end of the conduit 102 to assemble the conduit assembly 100. Moreover, by using the orientation components 302 of system 300 to orient the respective indicators 112 of the first conduit coupling 104-1 and the second conduit coupling 104-2, the operator may cause the first bend plane of the first conduit coupling 104-1 and the second bend plane of the second conduit coupling 104-2 to be oriented to each other at the particular orientation angle (e.g., identified in the assembly specification for the conduit assembly 100). Further, the first bend plane and the second bend plane may be oriented to each other at the particular orientation angle with a precision (a particular number of degrees) indicated by the widths of the respective indicators 112 of the first conduit coupling 104-1 and the second conduit coupling 104-2. For example, as shown in FIG. 3, the first bend plane and the second bend plane may be oriented to each other at an orientation angle of 280 degrees with a precision of 1 degree (e.g., when the widths of the respective indicators 112 of the first conduit coupling 104-1 and the second conduit coupling 104-2 indicate 1 degree).

As indicated above, FIG. 3 is provided as an example. Other examples may differ from what is described in connection with FIG. 3.

INDUSTRIAL APPLICABILITY

The disclosed conduit coupling may be used in any conduit assembly that utilizes conduit couplings with bent stems. Typically, when a conduit assembly is to be constructed to include conduit couplings with bent stems, such that respective bend planes of the conduit couplings are to be oriented to each other at a particular orientation angle, a human worker performs a time-consuming and labor-intensive process (e.g., that utilizes tools, jigs, and/or other devices) to attempt to ensure orientation at the particular orientation angle. However, this process can be inaccurate, particularly when bend angles of the stems of the conduit couplings are small and/or the particular orientation angle is small (e.g., because precision errors associated with the tools, jigs, and/or other devices become more significant when associated with small angles).

This can result in incorrect construction of the conduit assembly (e.g., the conduit assembly has an incorrect orientation angle) that, when the conduit assembly is installed for an intended purpose (e.g., on a machine), affects a performance and/or an operable life of the conduit assembly and/or the machine. For example, an incorrectly constructed conduit assembly has a higher likelihood, when installed on the machine, of kinking, looping, or twisting, which reduces an amount of fluid that can flow through the conduit assembly and/or increases an amount of stress exerted on the conduit assembly over time, which impacts its longevity.

The conduit coupling described herein includes an indicator that indicates an orientation of a bend plane of a stem of the conduit coupling that is bent at a particular bend angle (e.g., and that is bent by a system described herein for bending the stem and creating the indicator). Accordingly, the conduit coupling enables a simpler and more-streamlined construction of a conduit assembly. For example, an operator (e.g., using a system described herein for orienting a pair of conduit couplings) aligns respective indicators of a pair of conduit couplings (that are disposed on opposite ends of a conduit) with respective markings of a pair orientation components. This causes respective bend planes of the pair of conduit couplings to be oriented to each other at a particular orientation angle (e.g., that is associated with correct orientation of the respective bend planes of the pair of conduit couplings). No other tools, jigs, and/or other devices are needed to facilitate correct orientation of the respective bend planes of the pair of conduit couplings.

Further, because the respective indicators of the pair of conduit couplings have small widths, the respective bend planes of the conduit couplings can be oriented to each other at the particular orientation angle with precision (e.g., within 1 or 2 degrees of a specified orientation angle associated with correct orientation of the respective bend planes of the pair of conduit couplings). Accordingly, when installed for an intended purpose (e.g., on a machine), the conduit assembly constructed as described herein is less likely to suffer from issues that affect a performance and/or an operable life of the conduit assembly and/or the machine. For example, the conduit assembly has a decreased likelihood of kinking, looping, or twisting, and therefore a likelihood of restricted fluid flow through the conduit assembly is reduced and/or an amount of stress exerted on the conduit assembly over time is reduced, which improves its longevity (e.g., as compared to an incorrectly constructed conduit assembly).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," "left," "right," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A conduit coupling, comprising:
   a first connector at a first end of the conduit coupling;
   a second connector at a second end of the conduit coupling; and
   a stem between the first connector and the second connector, wherein:
      a first end of the stem is attached to the first connector,
      a second end of the stem is attached to the second connector,
      the stem is bent, along a bend plane, between a first portion of the stem and a second portion of the stem at a particular bend angle that is less than 90 degrees, and
      the first connector includes an indicator that indicates an orientation of the bend plane.

2. The conduit coupling of claim 1, wherein the indicator is:
   an indentation on a surface of the first connector, or
   an imprint on the surface of the first connector.

3. The conduit coupling of claim 1, wherein the indicator is shaped as at least one of:
   one or more lines,
   one or more arrows,
   one or more polygons, or
   one or more round shapes.

4. The conduit coupling of claim 1, wherein the indicator is on a surface of the first connector and is aligned with the bend plane.

5. The conduit coupling of claim 1, wherein the indicator is disposed on a surface of the first connector and the surface of the first connector has a cylindrical profile, and wherein the indicator has a width that is less than or equal to a portion of a circumference of the surface of the first connector that is associated with a particular degree value.

6. The conduit coupling of claim 5, wherein the particular degree value is less than or equal to 1 degree.

7. The conduit coupling of claim 1, wherein the indicator further indicates an amount of precision associated with indicating the orientation of the bend plane.

8. The conduit coupling of claim 1, wherein the indicator is an indentation on a surface of the first connector.

9. A conduit assembly, comprising:
a conduit;
a first conduit coupling attached to a first end of the conduit; and
a second conduit coupling attached to a second end of the conduit, wherein:
the first conduit coupling includes a first stem bent, along a first bend plane, between a first portion of the first stem and a second portion of the first stem at a particular bend angle that is less than 90 degrees
the first conduit coupling includes a first indicator that indicates an orientation of the first bend plane,
the second conduit coupling includes a second stem bent at a second bend angle along a second bend plane, and
the second conduit coupling includes a second indicator that indicates an orientation of the second bend plane.

10. The conduit assembly of claim 9, wherein:
the first indicator is on a surface of the first conduit coupling and is aligned with the first bend plane; and
the second indicator is on a surface of the second conduit coupling and is aligned with the second bend plane.

11. The conduit assembly of claim 9, wherein each of the first indicator and the second indicator is shaped as at least one of:
one or more lines,
one or more arrows,
one or more polygons, or
one or more round shapes.

12. The conduit assembly of claim 9, wherein each of the first indicator and the second indicator is:
an indentation, or
an imprint.

13. The conduit assembly of claim 9, wherein:
the first indicator is disposed on a first surface of the first conduit coupling that has a cylindrical profile,
a width of the first indicator is less than or equal to a portion of a circumference of the first surface that is associated with a particular degree value,
the second indicator is disposed on a second surface of the second conduit coupling that has a cylindrical profile, and
a width of the second indicator is less than or equal to a portion of a circumference of the second surface that is associated with the particular degree value.

14. The conduit assembly of claim 13, wherein the particular degree value is less than or equal to 1 degree.

15. The conduit assembly of claim 9, wherein:
the first indicator further indicates an amount of precision associated with indicating the orientation of the first bend plane; and
the second indicator further indicates an amount of precision associated with indicating the orientation of the second bend plane.

* * * * *